United States Patent [19]

Liu

[11] Patent Number: 5,247,431
[45] Date of Patent: Sep. 21, 1993

[54] INDICATING LIGHT FOR CYCLES

[76] Inventor: Zuo H. Liu, No. 61, Sec. 2, Tung Hsing Rd., Taichung, Taiwan

[21] Appl. No.: 947,537

[22] Filed: Sep. 21, 1992

[51] Int. Cl.⁵ .............................................. B64J 6/00
[52] U.S. Cl. .................................................... 362/72
[58] Field of Search ........................................ 362/72

[56] References Cited

U.S. PATENT DOCUMENTS

| | | | |
|---|---|---|---|
| 2,469,944 | 5/1949 | Banters | 362/72 |
| 2,603,701 | 7/1952 | Schadel | 362/72 |
| 4,623,954 | 11/1986 | Schott et al. | 362/72 |
| 4,716,502 | 12/1987 | Schott et al. | 362/72 |
| 4,875,142 | 10/1989 | Spector | 362/72 |

Primary Examiner—Carroll B. Dority
Attorney, Agent, or Firm—Bacon & Thomas

[57] ABSTRACT

An indicating device is disposed in the end portion of the handlebar of a bicycle for indicating the turning of the bicycle, the device includes a barrel engaged in the handlebar, a light bulb disposed in the outer end of the barrel, a battery disposed in the barrel for energizing the light bulb, and a switch connected between the light bulb and the battery for controlling the energizing of the light bulb.

7 Claims, 2 Drawing Sheets

INDICATING LIGHT FOR CYCLES

BACKGROUND OF THE INVENTION

1. Field of the Invention

The present invention relates to an indicating device, and more particularly to an indicating light for cycles.

2. Description of the Prior Art

Typically, no indicating devices are provided on the bicycles such that the driver has to raise his hands to indicate that he is going to turn either right or left; this is dangerous.

The present invention has arisen to mitigate and/or obviate the afore-described disadvantages of the conventional cycles.

SUMMARY OF THE INVENTION

The primary objective of the present invention is to provide an indicating light for indicating the turning of the cycles.

In accordance with one aspect of the invention, there is provided an indicating device for a bicycle comprising a barrel engaged in a handlebar of the bicycle and including an inner end located within the handlebar and an outer end, a light bulb disposed in the outer end of the barrel, at least one battery disposed in the barrel for energizing the light bulb, and a switch means connected between the light bulb and the battery for controlling the energizing of the light bulb.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
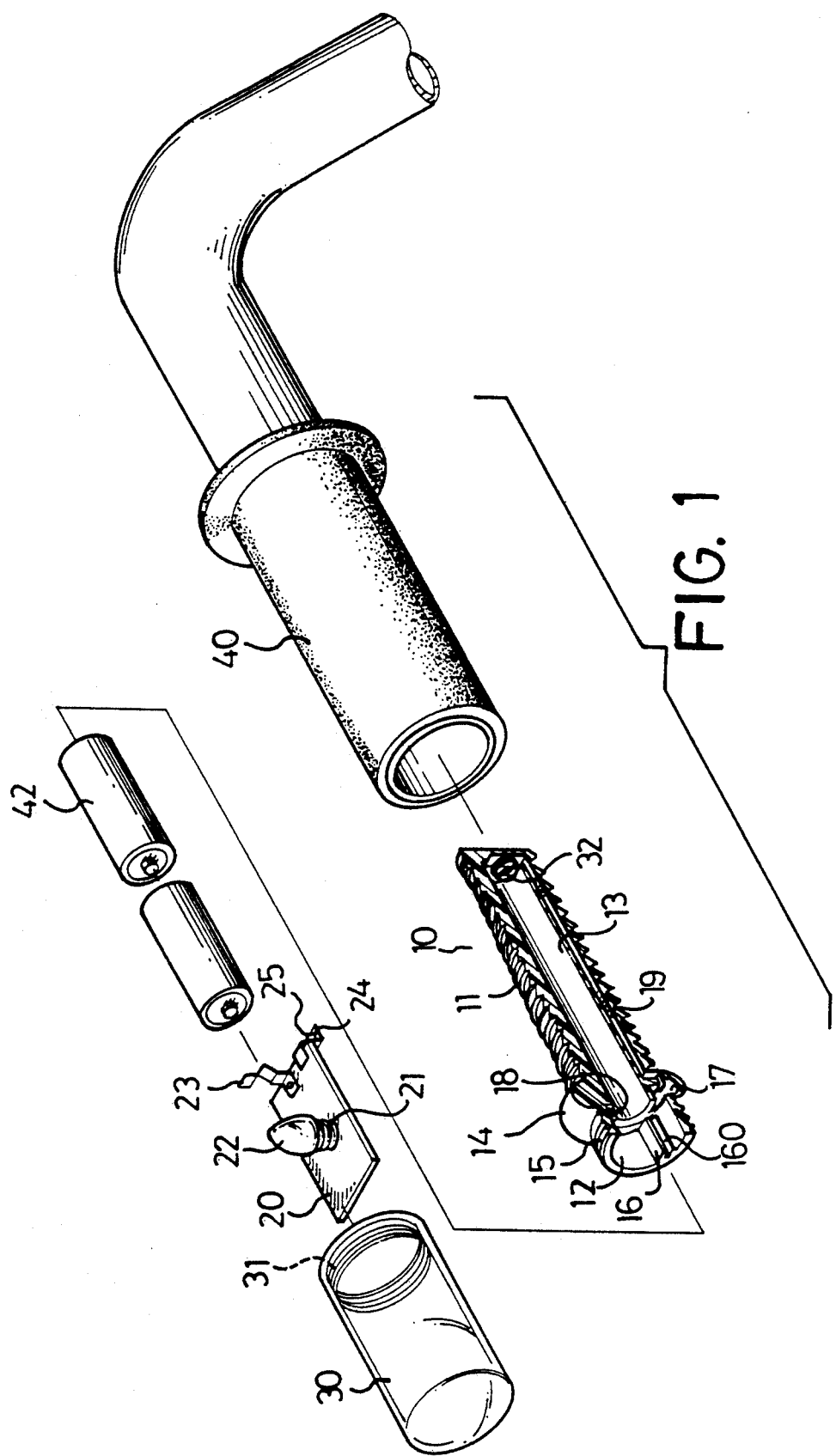
FIG. 1 is a perspective view of an indicating light in accordance with the present invention.
Figure 2:
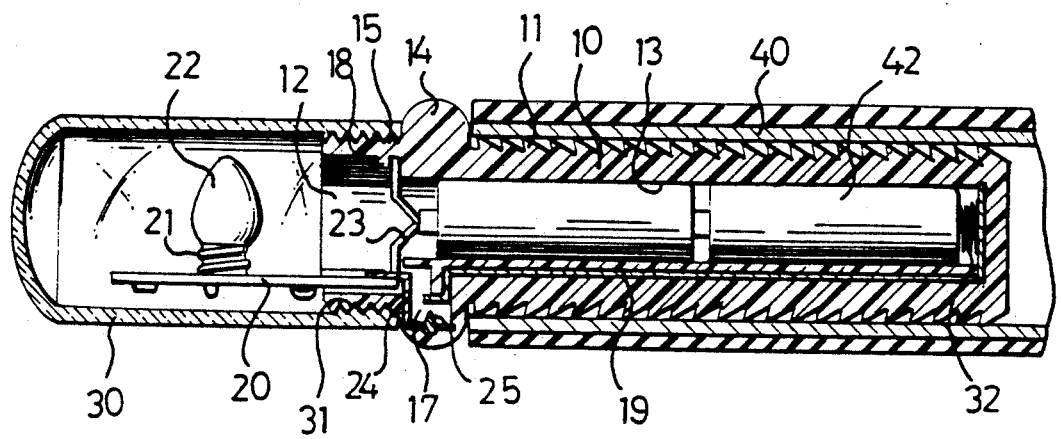
FIG. 2 is a cross sectional view taken along lines 2—2 of FIG. 1.
Figure 3:
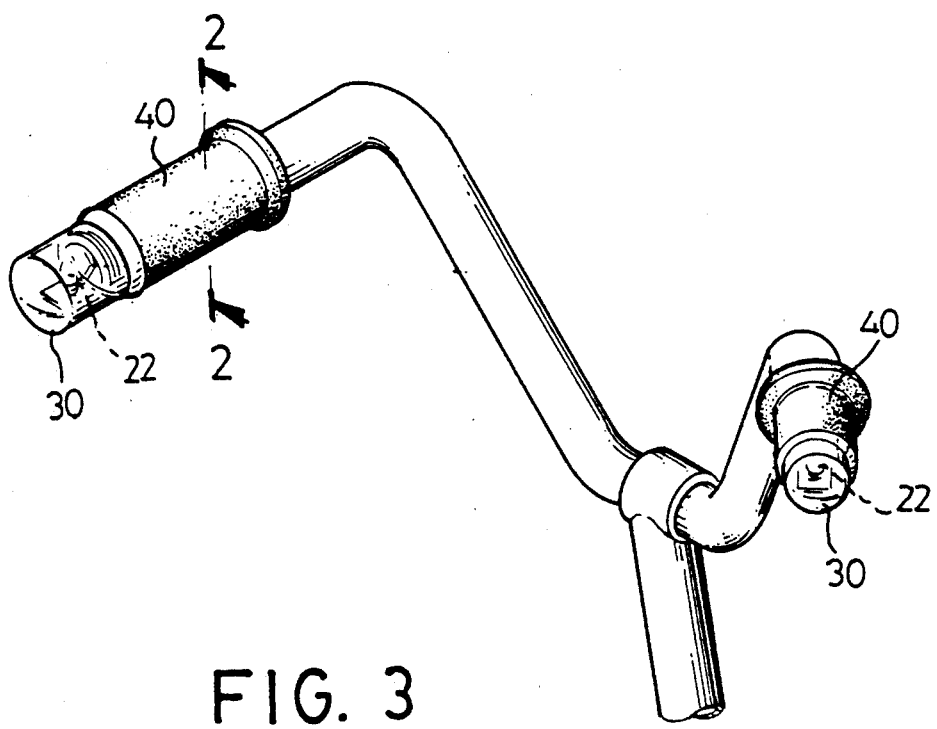
FIG. 3 is an exploded view of the indicating device.

Referring to the drawings, an indicating device in accordance with the present invention comprises generally a barrel 10 engaged in the free end portion of the handlebar, particular the hand grip portion 40 of the handlebar, a plurality of annular ribs 11 formed on the outer peripheral portion of the barrel 10 and formed as ratchet teeth, best shown in FIG. 2, such that the barrel 10 can be easily force-fitted in the handlebar and can not be easily disengaged from the handlebar, the barrel 10 includes an open end 12 for insertion of the batteries 42 and includes a bore 13 for accommodating the batteries 42. An annular rib 14 is formed on the outer portion of the barrel 10 close to the open end 12 thereof for engagement with the end portion of the handlebar 40 in order to limit the inward movement of the barrel 10 in the handlebar 40. An outer thread 15 is formed on the outer peripheral portion of the open end 12 of the barrel 10. A channel 16 includes two dovetail slots 160 each formed in a protrusion and the like. A depression 17 is formed in the inner and lower portion of the annular rib 14, and a stop 18 is formed in the upper portion of the upper end 12 of the barrel 10.

A spring 32 is disposed in the inner end of the bore 13 of the barrel 10 for engagement with the case electrode of the battery 42, a strip 19 includes one end connected with the spring 32 and the other end extended in the depression 17 of the annular rib 14. A board 20, such as an electric board, is engaged in the channel 16 of the barrel 10 and includes a socket 21 disposed thereon for engagement with the light bulb 22, a conductor 23 is electrically connected to the center electrode of the light bulb 22 and electrically contacted with the center electrode of the battery 42, and another conductor 24 is electrically connected to the case electrode of the light bulb 22 and includes a free end portion extended in the depression 17 of the annular rib 14 and having a protrusion 25 formed thereon for engagement with the other end of the strip 19 when the free end of the conductor 24 is depressed. The upper end of the conductor 23 is engaged with the stop 18 and is retained in place by the stop 18. A cap 30 includes an inner thread 31 formed therein for engagement with the outer thread 15 of the barrel 10 so as to enclose the board 20 and the light bulb 22.

In operation, the free end portion of the conductor 24 is pushed to contact with the other end of the strip 19 when the free end portion of the conductor 24 is depressed by the user such that the electric circuit is closed and such that light bulb 22 is energized. The electric circuit is opened when the free end portion of the conductor 24 is released. When it is required to turn right, the conductor 24 on the right side of the handlebar is depressed such that the light bulb 22 on the right side of the handlebar is energized in order to give a right turn signal. However, when it is required to turn left, the light bulb 22 of the left side of the handlebar is energized in order to generate a left turn signal.

Accordingly, the indicating device in accordance with the present invention may generate a signal in order to indicate the turning movements of the cycles.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An indicating device for a bicycle comprising a barrel engaged in a handlebar of said bicycle and including an inner end located within said handlebar and an outer end, said barrel further including a channel formed in said outer end, a board is engaged in said channel, a light bulb engaged in said board and disposed in said outer end of said barrel, at least one battery disposed in said barrel for energizing said light bulb, and a switch means connected between said light bulb and said battery for controlling the energizing of the light bulb.

2. An indicating device according to claim 1, wherein said board is an electric board, a first conductor is electrically connected said light bulb and a center electrode of said battery, a strip includes a first end electrically connected with a case electrode of said battery and a second end extended toward said outer end of said barrel, and a second conductor includes a first end electrically connected to said light bulb and a second end extended below said second end of said strip for engagement with said second end of said strip when said second end of said second conductor is depressed.

3. An indicating device according to claim 2, wherein said barrel includes an annular rib formed on an outer peripheral portion thereof and close to said outer end thereof, a depression is formed in said annular rib for receiving said second end of said second conductor.

4. An indicating device according to claim 2, wherein said second end of said second conductor includes a protrusion formed thereon for engagement with said second end of said strip.

5. An indicating device for a bicycle comprising a barrel engaged in a handlebar of said bicycle and including an inner end located within said handlebar and an outer end, an electric board engaged in said outer end of said barrel, a light bulb disposed on said electric board, at least one battery disposed in said barrel for energizing said light bulb, a first conductor electrically connected said light bulb and a center electrode of said battery, a strip including a first end electrically connected with a case electrode of said battery and a second end extended toward said outer end of said barrel, and a second conductor including a first end electrically connected to said light bulb and a second end extended below said second end of said strip for engagement with said second end of said strip when said second end of said second conductor is depressed, whereby, said light bulb is energized when said second end of said second conductor is depressed.

6. An indicating device according to claim 5, wherein said barrel includes an annular rib formed on an outer peripheral portion thereof and close to said outer end thereof, a depression is formed in said annular rib for receiving said second end of said second conductor.

7. An indicating device according to claim 5, wherein said second end of said second conductor includes a protrusion formed thereon for engagement with said second end of said strip.

* * * * *